United States Patent [19]
Kim et al.

[11] Patent Number: 6,005,320
[45] Date of Patent: Dec. 21, 1999

[54] TWO-PHASE BRUSHLESS DIRECT-CURRENT MOTOR HAVING SINGLE HALL EFFECT DEVICE

[75] Inventors: Byung Kyu Kim; Joon Kim, both of Seoul, Rep. of Korea

[73] Assignee: Amotron Co., Ltd., Kyungki-do, Rep. of Korea

[21] Appl. No.: 09/337,643

[22] Filed: Jun. 22, 1999

[51] Int. Cl.$^6$ .................................................. H02K 21/12
[52] U.S. Cl. .......................... 310/156; 310/268; 310/114; 310/68 B; 310/266; 310/51; 310/DIG. 3
[58] Field of Search .................................. 310/156, 268, 310/114, 68 B, 266, 51, DIG. 3

[56] References Cited

U.S. PATENT DOCUMENTS 4,211,963   7/1980   Muller ....................................... 310/268

*Primary Examiner*—Nestor Ramirez
*Assistant Examiner*—Saeed Ghahramani
*Attorney, Agent, or Firm*—Rosenberg, Klein & Lee

[57] ABSTRACT

A two-phase brushless direct-current (BLDC) motor having a single Hall effect device. The BLDC motor includes a stator comprised of 2n coils grouping as first and second phase coils at a uniform interval, and a rotor which N-pole and S-pole magnets of the same number as that of the stator coils are alternately disposed, the 2n magnets forming n pairs, each pair of magnets are disposed at a uniform interval, wherein a distant ratio from the center of one N-pole magnet to the centers of the S-pole magnets adjacent the N-pole magnet is established into 1:1.4. Since 2n auxiliary magnets are disposed annularly on the rotor with the same length as each other corresponding to the N-pole and S-pole magnets, a single Hall effect device detects the magnetic pole by magnetic flux of the rotating auxiliary magnets and generates the rotating position signal of the rotor, so that a switching controller can activate the first and second phase coils alternately. Thus, the motor has a simple driving circuit, a high efficiency and a small torque ripple.

7 Claims, 8 Drawing Sheets

TWO-PHASE BRUSHLESS DIRECT-CURRENT MOTOR HAVING SINGLE HALL EFFECT DEVICE

BACKGROUND OF THE INVENTION

1. Field of the Invention

The present invention relates to a two-phase brushless direct-current (BLDC) motor having a single Hall effect device, and more particularly, to a BLDC motor having a single position sensing device in which a driving circuit is very simple since a rotor can be driven without creating a dead point and a high efficiency and a small torque ripple are accomplished since magnets are efficiently arranged.

2. Description of the Related Art

Generally, BLDC motors are classified into a cup-shaped (cylindrical) core type (or a radial type) and a coreless type (or an axial type), depending upon whether or not a stator core exists.

The core type BLDC motors are classified into an internal magnet type BLDC motor including a cylindrical stator in which coils are wound on a plurality of protrusions formed on its inner circumference to provide electromagnetic structure and a rotor composed of cylindrical permanent magnets and an external magnet type BLDC motor including a stator in which coils are wound up and down on a plurality of protrusions formed on its outer circumference and a rotor composed of multipolar magnetized cylindrical permanent magnets outside the stator.

Since its magnetic circuit has an axially symmetrical structure in radial direction, the core type BLDC motor makes little vibratile noise during operation and is suitable for low-speed rotation, providing an excellent torque. However, the core type BLDC motor results in many a loss of material for a yoke during fabrication of its stator and requires great expense for facility investment for mass production. In addition, since its stator and rotor are of complicated structure, it is not easy to make the motor compact, and it cannot assure high efficiency and creates an undesirable cogging torque.

Meanwhile, a conventional coreless BLDC motor provided in order to improve the disadvantages of the above-described core type BLDC motor has such a structure that rotors each of which consists of an annular magnet and a yoke are fixed to a rotational shaft and stators each formed by winding a plurality of stator coils on a printed circuit board (PCB) are connected to the rotational shaft via bearings.

In the coreless BLDC motor, a magnetic circuit is axially formed between the rotors incorporated with a plurality of sets of magnets and stators composed of stator coils generating a plurality of sets of electromagnetic force which are disposed below the rotors. Thus, although a buffer spring is inserted between the bearings, the coreless BLDC motor generates great axial vibrations due to the stators' attracting or repelling force and their unequal magnetization.

Besides, the axial vibrations induces a resonance of the overall system employing the coreless BLDC motor, thereby increasing noise during rotation. Accordingly, the entire motor's efficiency is excellent without having a great loss during high-speed rotation, but may induces abnormal noise since the rotational noise is mixed with the vibratile noise.

As a result, the coreless BLDC motor can minimize a loss of materials, having a good mass productivity and making the motor thinner and more compact, thereby accomplishing low cost and high efficiency in comparison to the core BLDC motor, but much noise is generated due to the axial vibration during rotation.

To solve the above demerits of the coreless BLDC motor, the same applicant has proposed a double rotor-double stator coreless BLDC motor which can offset the axial vibration generated during rotation of the rotor and increase the torque more than two times. Since the motor has the double-double stator structure in which a plurality of wound stator coils are mounted in the middle of respective first and second double rotors on the left and right sides of the PCB, a magnetic circuit is formed in symmetry with the whole stators' and rotors' rotational shaft. Thus, the double rotor/double stator structure offsets the attracting or repelling force acting on the first and second rotors by the stators, thereby minimizing the axial vibrations of the rotors.

Meanwhile, the same applicant has proposed an improved invention as shown in FIG. 1, in which the stators of the double rotor/double stator coreless BLDC motor is incorporated into a single body by an insert molding, thereby increasing durability and saving production cost. Referring to FIG. 1, the BLDC motor will be described below.

In the conventional BLDC motor as shown in FIG. 1, an outer circumference 67 of a stator 51 is extended up and down in the middle of upper and lower cases 71A and 71B, to thereby form a cylindrical casing.

An upper rotor 73A and a lower rotor 73B having a magnet division multipolar arrangement structure spaced by a predetermined air gap from the upper and lower portion of the stator 51 are fixedly coupled to a rotational shaft 77 via bushings 75A and 75B at the center of the rotational shaft 77.

In the case that the BLDC motor is a three-phase driven motor, each rotor 73A or 73B has such a structure that a magnetic circuit is formed with respect to twelve magnets 81A and 81B, in which the twelve magnets 81A and 81B, that is, six disc-shaped N-pole magnets 81A and six disc-shaped S-pole magnets 81B are alternately formed as non-ferromagnetic materials such as PET (polyethylene terephthalate), nylon-66 or PBT (polybutylene terephthalate). Here, a circumference of each rotor is supported by a support 79 integrally formed on the bushings 75A and 75B, and annular magnetic yokes 83A and 83B are attached to the rear surfaces of the rotors.

Meanwhile, a position detection auxiliary magnet 85 is disposed at the upper side of the magnetic yoke 83A in the upper rotor 73A. The auxiliary magnet 85 is disposed in correspondence to three Hall effect devices (H1–H3) 89 in a control PCB 87 fixedly disposed in the inner circumference of the upper case 71A. A female connector 91 to which the upper terminal 63 of the stator 51 is forcedly connected is mounted on one side of the control PCB 87.

Upper and lower bearings 93A and 93B are fixedly mounted on the central portions of the upper case 71A and the lower case 71B. The rotational shaft 77 of the rotors 73A and 73B is rotatably supported through the bearings 93A and 93B. Also, the stator 51 is comprised of nine angular bobbin coils or bobbinless coils (L1–L3) 55 which are formed in the form of a disc by an insert molding method using a resin insulating material, on an auxiliary PCB 57.

In the conventional three-phase driven BLDC motor, the rotor is comprised of twelve N-pole and S-pole magnets 81A and 81B which are disposed at an equal interval, and the stator is comprised of nine coils 55 which are disposed at an equal interval, both of which are shown in FIG. 2.

In the stator, nine coils 55 are divided into three phases, e. g. each phase u, v, w including three coils which are connected in series and connected in the star (Y) connection as shown in FIG. 4. When positions of the rotors are detected sequentially by the three position detection Hall effect devices H1–H3, a switching transistor 97 is so driven that current sequentially flows through coils of two phases among the stator coils L1–L3 of the three phases, at a predetermined angle by a three-phase logic integrated circuit (IC) 95. In this case, three-phase induced electromotive force curves u, v and w each formed as a sinusoidal wave in the conventional motor are shown in FIG. 3.

That is, the end points of the three phases are connected to each other in the BLDC motor employing the three-phase full-wave driving method. In view of one phase, three processes are repeated in such a manner that current flows in one direction, flows in the opposite direction and then sinks.

Thus, the three-phase full-wave driving method requires three Hall effect devices, three-phase logic IC and six switching transistors, which are considerably expensive in their product cost.

Meanwhile, a general two-phase full-wave driving method requires two Hall effect devices and four switching transistors and a general two-phase half-wave driving method requires two Hall effect devices and two switching transistors. However, a non-start zone or dead point essentially exists in the two-phase half-wave driving system. Thus, a special counter-measure is needed in order to avoid the non-start zone or the dead point at the start of the motor. Also, since an induced electromotive force is low, the efficiency of the motor is low and a great torque ripple appears.

As a prior art reference, U. S. Pat. No. 4,211,963 discloses a two-phase driven BLDC motor including a non-symmetrical rotor subdivided into two monopole zones having uniform magnetization throughout their radial extent and two dipole zones of magnetization having opposite poles of magnetization with respect to their radial extent, and a single Hall effect device for detecting position of the rotor.

Since the two dipole zones used for the positional detection of the rotor are subdividingly magnetized and arranged on the same circumference of a single permanent magnet together with the two monopole zones in U. S. Pat. No. 4,211,963, magnetization of the permanent magnet forming the rotor is in trouble.

SUMMARY OF THE INVENTION

To solve the above problems, it is an object of the present invention to provide a BLDC motor having a single position detecting device in which a driving circuit is very simple since a rotor can be driven without creating a dead point and the driving circuit does not require a logic IC for controlling a switching driving circuit.

It is an another object of the present invention to provide a BLDC motor in which a high efficiency and a small torque ripple are accomplished since magnets in the rotor are efficiently arranged.

To accomplish the above object of the present invention, there is provided a two-phase half-wave driven brushless direct-current (BLDC) motor comprising: a stator comprised of a first phase coil, a second phase coil, and a first anular support, each of the first phase coil and the second phase coil being formed of n coils, the first phase coil and the second phase coil being connected in a two-phase driving form and disposed at a uniform interval on the annular support; a shaft whose ends are rotatably supported; a rotor comprised of n N-pole and n S-pole magnets which are the same number as that of the stator coils and form n pairs of N-pole and S-pole magnets, a magnetic yoke for forming a magnetic circuit together with the n N-pole and n S-pole magnets, and a second annual support on which the n N-pole and n S-pole magnets are alternately disposed, the rotor being supported to the shaft spacing a predetermined air gap from the stator in an axial direction, wherein each pair of N-pole and S-pole magnets are disposed at a uniform interval with respect to each other, and wherein a distant ratio from a first center of one N-pole magnet to a second and third centers of the S-pole magnets adjacent the N-pole magnet is established into 1:1.4; auxiliary magnets for distinguishing the 2n N-pole and S-pole magnets, the auxiliary magnets comprising n N-pole and n S-pole magnets alternately disposed in the form of an annular ring on the rotor with the same length as each other, in correspondence to the respective N-pole and S-pole magnets of the rotor; a single Hall effect device for detecting the magnetic poles of the rotor by magnetic flux generated from the rotating auxiliary magnets and generating rotating position signals of the rotor; and a switching controller for activating the first and second phase coils alternately in response to the rotating position signals.

Here, each of the auxiliary magnets is established from a first midpoint between the pair of the N-pole and S-pole magnets of the rotor to a second midpoint between the adjacent magnets, in which an arc angle of each of the auxiliary magnets is 360/2n degrees.

In addition, the auxiliary magnets are penetratively embedded into the support of the rotor or installed on the rear surface of the magnetic yoke.

The rotating position signal generated from the Hall effect device is a rectangular signal having a duty of 50% and electrical activation between the first phase coil and the second phase coil is accomplished by 180 degrees.

The switching controller includes a first transistor for electrically activating the first phase coil when the rotating position detecting signal is applied as a high-level signal and a second transistor for electrically activating the second phase coil when the rotating position detecting signal is applied as a low-level signal.

The distance between the one magnet pair and adjacent magnet pairs in the rotor is double as much as that between the N-pole and S-pole magnets forming the magnet pair.

As described above, since the number of magnets (poles) in the rotor is equal to that of the coils and the magnets are disposed at different intervals between the magnets, and a switching operation is accomplished at the portion having a positive value of the induction electromotive force using the two-phase half-wave driving method, the present invention can obtain the BLDC motor having a single position detecting device in which a driving circuit is very simple since a rotor can be driven without creating a dead point, and a high efficiency and a small torque ripple are accomplished since magnets are efficiently arranged.

BRIEF DESCRIPTION OF THE DRAWINGS

The objects and other advantages of the present invention will become more apparent by describing in detail the structures and operations of the present invention with reference to the accompanying drawings, in which.

DETAILED DESCRIPTION OF THE EMBODIMENTS

A preferred embodiment of the present invention will be described in detail with reference to the accompanying drawings.

First, if a motor having a new structure according to the present invention employs a two-phase half-wave driving method, the present invention can be applied to any motor such as a single rotor/single stator BLDC motor, a double rotor/single stator BLDC motor or a double stator/single rotor BLDC motor. Thus, the present invention will be described below with reference to the double rotor/single stator BLDC motor of FIG. 1 if required.

Figure 5:
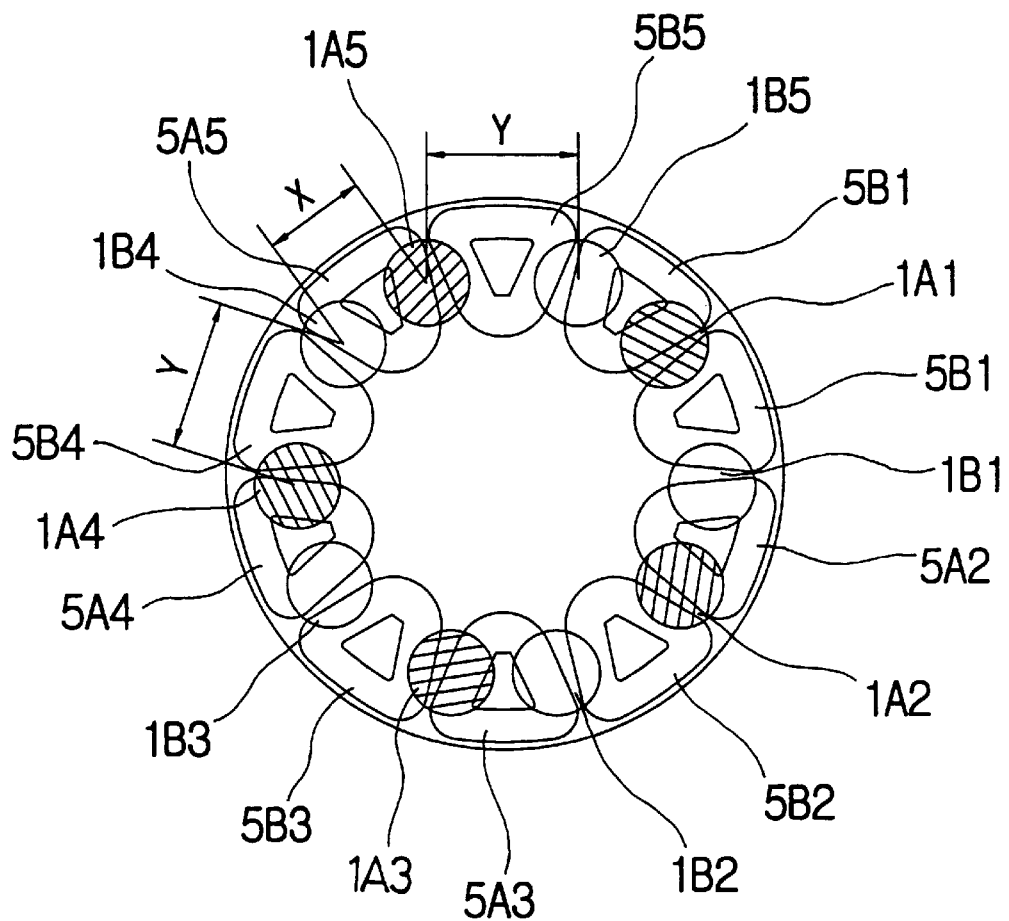
FIG. 5 shows a relationship in arrangement between the rotor and the stator in a BLDC motor according to the present invention.
Figure 6:
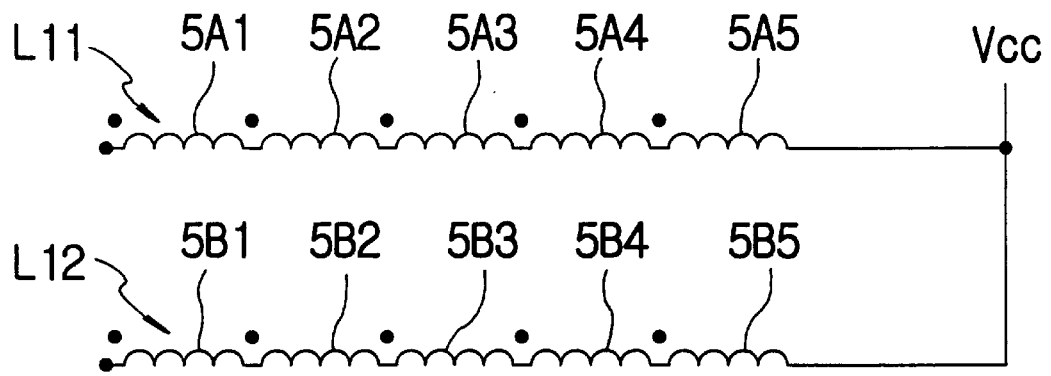
FIG. 6 shows a connection diagram of the stator coils in the two-phase driving method which is applied to the present invention.

FIG. 5 shows a relationship in arrangement between the rotor and the stator in a BLDC motor according to the present invention. A stator includes 2n stator coils 5A1–5A5 and 5B1–5B5 in which n is a positive integer.

Figure 9:
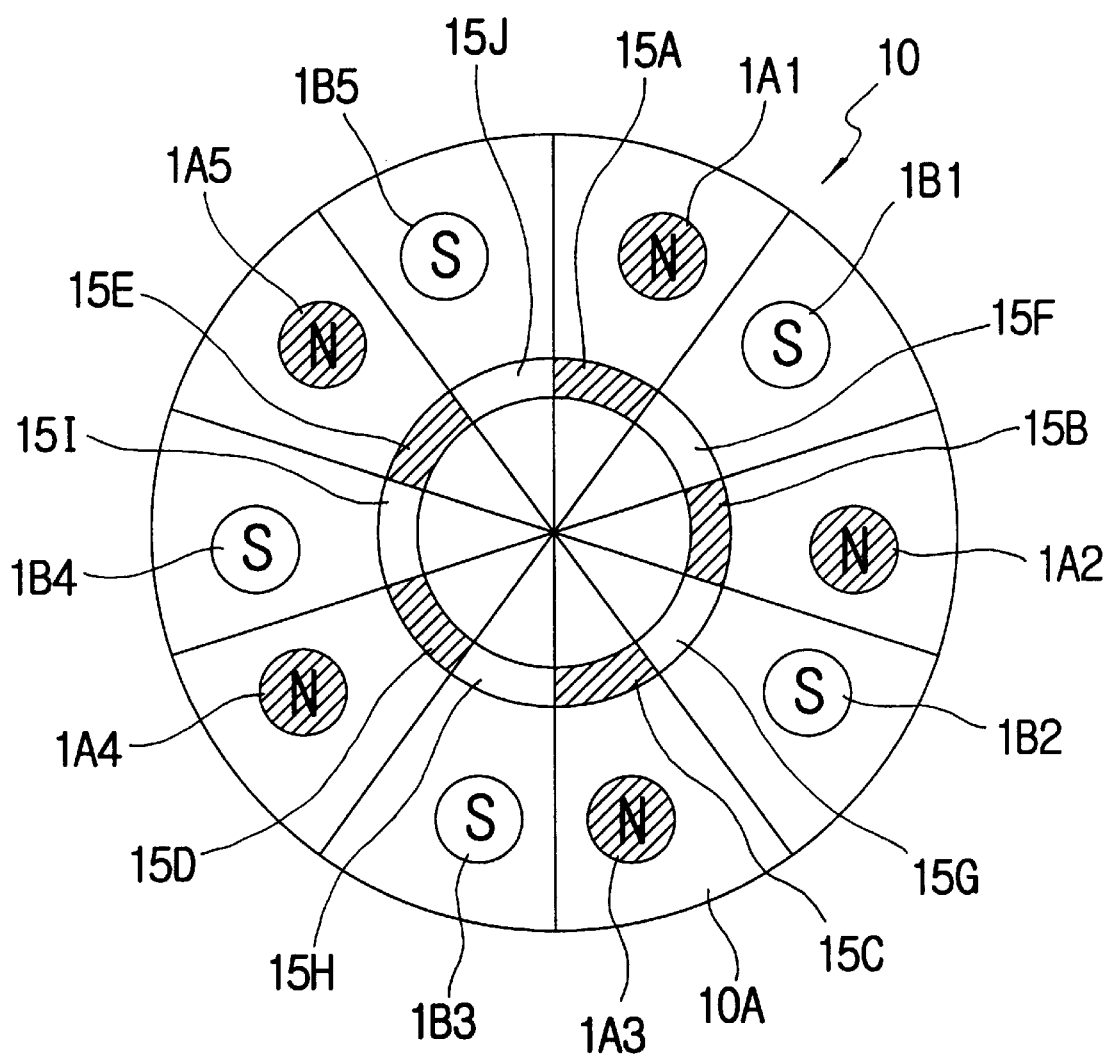
FIG. 9 is a plan view showing the relationship between the rotor magnets and the position detection auxiliary magnets according to the present invention.

As shown in FIG. 9, a rotor 10 of the present invention has such a structure that a plurality of sets of N-pole and S-pole magnets are alternately penetratively inserted into a support 10A formed of a generally disc-shaped non-ferromagnetic material.

Here, when n equals five, five N-pole magnets 1A1–1A5 and five S-pole magnets 1B1–1B5 are alternately disposed as rotor magnets in a rotor support 10A. The stator coils are connected in the two-phase driving form, in which five A-phase coils 5A1–5A5 and five B-phase coils 5B1–5B5 are connected in series to each other in their one ends and the respective other ends are commonly connected through which a power supply voltage is applied.

Figure 1:
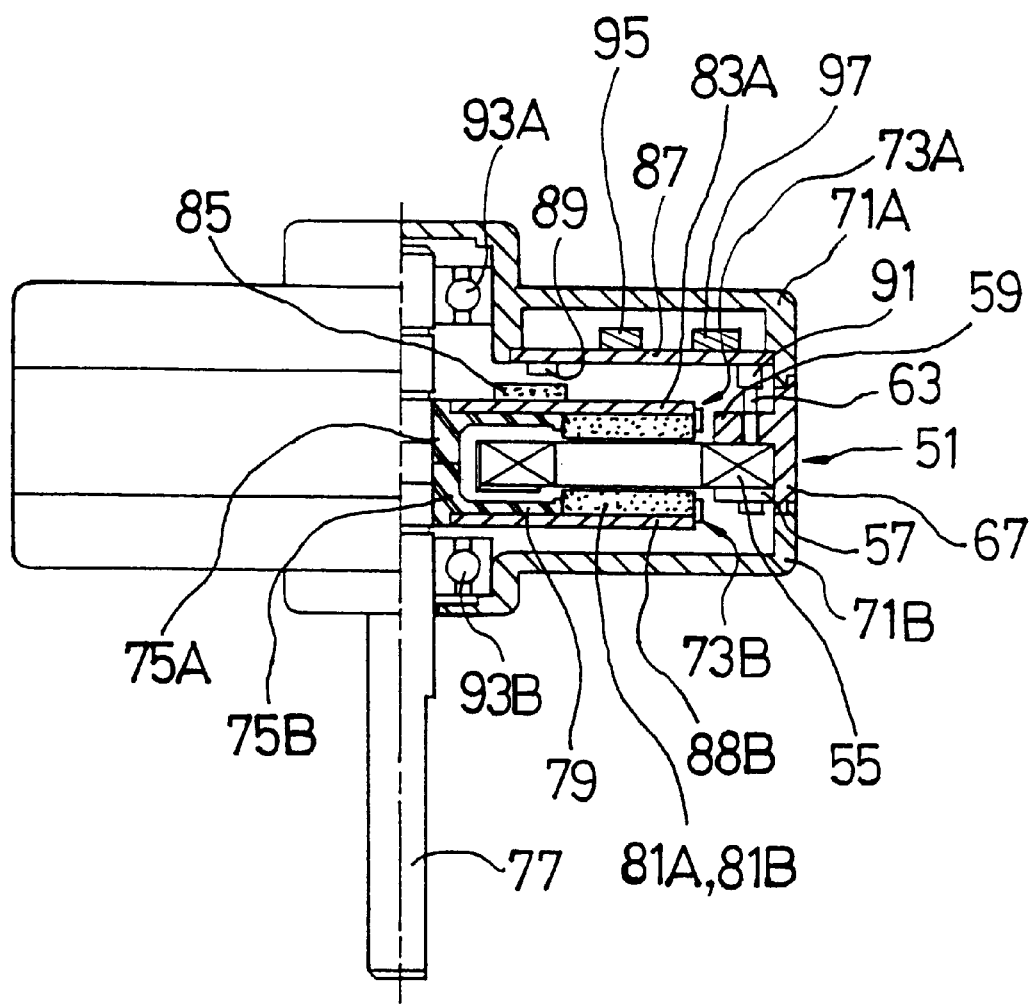
FIG. 1 is a sectional view in axial direction showing a double rotor type BLDC motor to which the present invention can be applied.

In this case, the five A-phase coils 5A1–5A5 and five B-phase coils 5B1–5B5 are alternately disposed as shown in FIG. 5. Here, bobbin type or bobbinless coils are integrally molded in the form of a disc by a resin insulation material by using an insert molding method as shown in FIG. 1. Otherwise, coils can be attached on a PCB substrate as desired.

The stator coils 5A1–5A5 and 5B1–5B5 are disposed on the same circumference at the same interval with respect to each other. In the ideal case, the interval between coils is zero. The rotor magnets 1A1–1A5 and 1B1–1B5 are disposed in the relationship facing the adjacent two coils, respectively. However, the interval in the arrangement of the rotor magnets is not same as described below.

Figure 7:
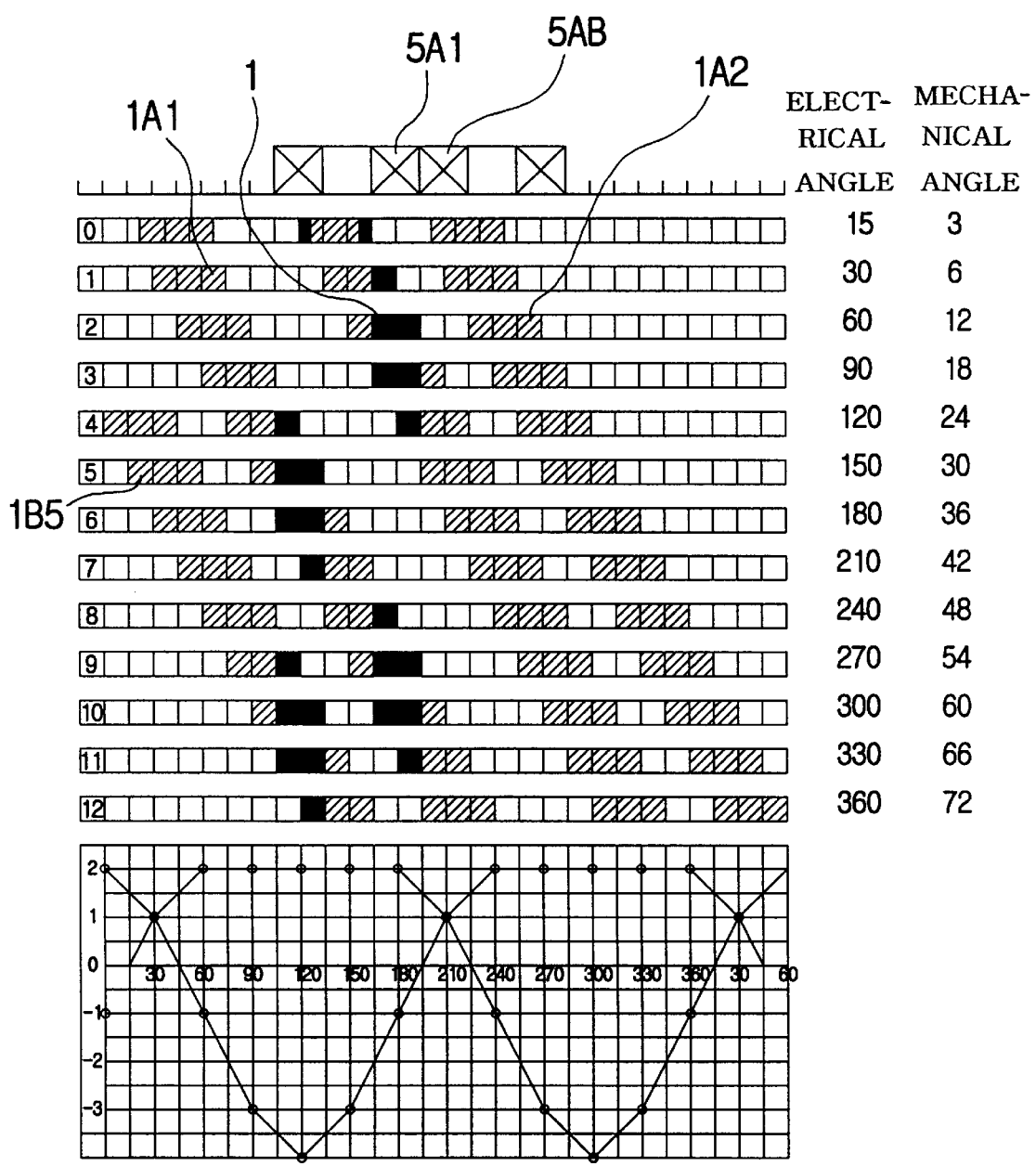
FIG. 7 is a graphical view showing a relationship between the rotor and the stator linearly according to an electrical angle and a mechanical angle in order to explain an electromagnetic force acting between the rotor and the stator during rotation of the rotor in FIG. 5.

A graph where the arrangement of the stator coils 5A1–5A5 and 5B1–5B5 and the rotor magnets 1A1–1A5 and 1B1–1B5 is linearly shown for better understanding is shown in FIG. 7.

As shown in FIG. 7, the width of one side of wound coils 5A1 and 5B1 are expressed as two squares and the whole coil 5A1 or 5B1 is expressed as six squares. The width of each magnet 1A1 or 1B1 shaded is set as three squares. Here, in the ideal case, the interval between the coil 5A1 and the coil 5B1 is zero.

Since the coils 5A1 and 5B1 are fixed and the rotor magnets 1A1 and 1B1 move in the actual structure, the magnets 1A1 and 1B1 shift one square to the right when a position proceeds from zero to twelve.

In the case of a ten-pole, ten-coil motor, since an electrical angle equals a mechanical angle multiplied by the number of poles divided into two, that is, (electrical angle)= (mechanical angle)×(the number of poles)÷2, the interval between the respective steps in the positional movement of the rotor magnets 1A1 and 1B1 from the position 0 to the position 12 of the rotor is set as an electrical angle of thirty degrees and a mechanical angle of six degrees. In this case, the interval between the respective magnets is set as two squares or four squares differently from each other. Thus, the ratio of the distances X and Y from the center of one magnet to the center of the adjacent magnets equals 5:7, that is, 1:1.4. That is, X:Y=1:1.4.

Figure 2:
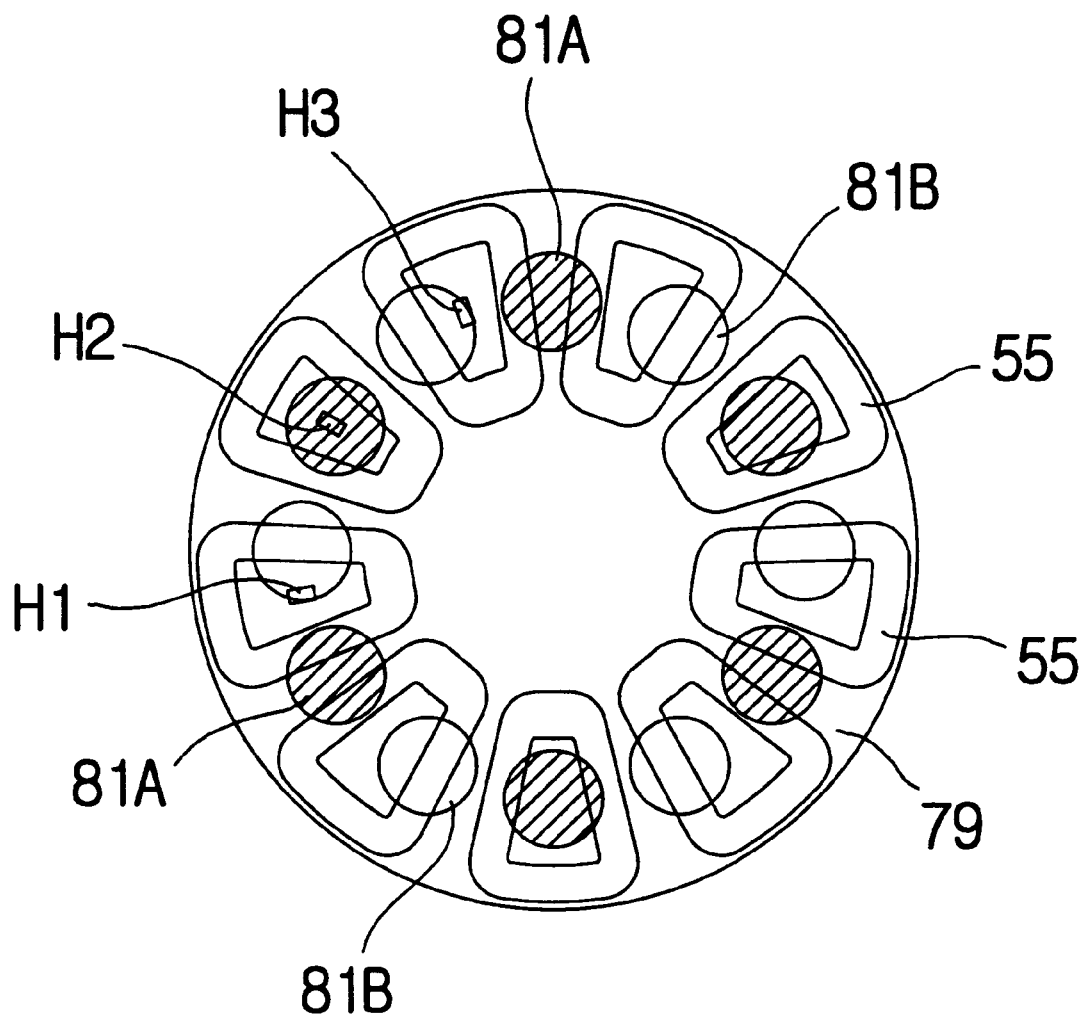
FIG. 2 shows a relationship in arrangement between the rotor and the stator in a conventional BLDC motor.
Figure 3:
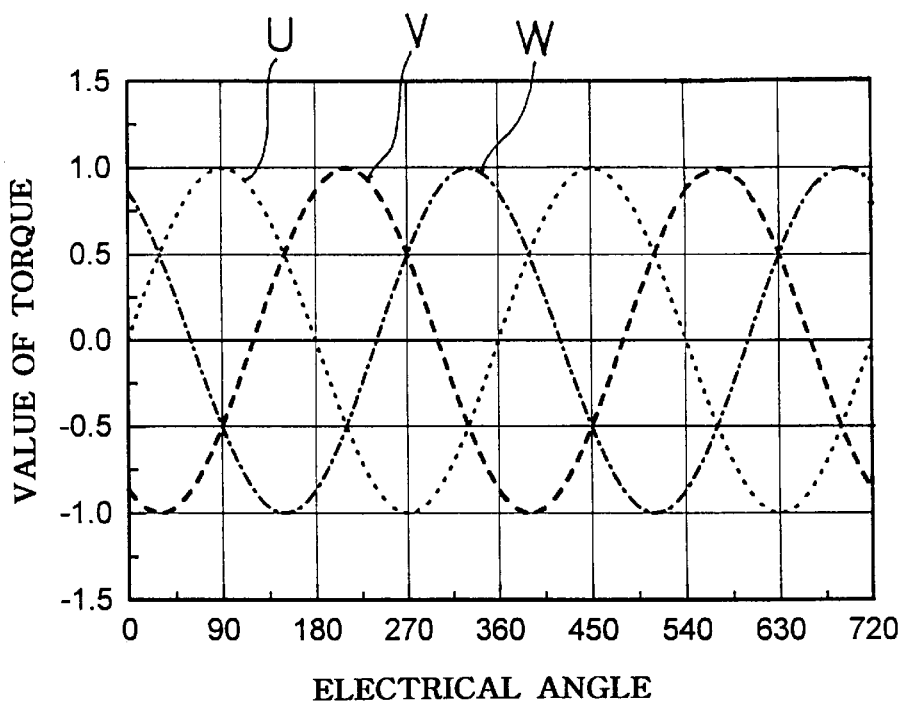
FIG. 3 is a graphical view showing an induced electromotive force according to an electrical angle in a three-phase driven motor.

The non-uniform arrangement of the magnets differs greatly from the uniform arrangement of the magnets in the conventional BLDC motor shown in FIG. 2.

When the rotor magnets and the stator coils are disposed in the above-described relationship and move relatively each other, an induced voltage (electromotive force) E having the relationship expressed as a following equation (1) is obtained according to the law of the Fleming's right-hand. The induced electromotive force E is very important in understanding characteristics of the motor.

$$E = Blv \quad (1)$$

Here, B denotes a flux density of a magnet, l denotes the length of the coil conductor existing in the flux, and v denotes a relative velocity between the magnet and the coil conductor.

In the equation (1), assuming the motor rotates at a constant velocity, since the coils wound and the size of the magnet is constant, the length l of the coil conductor and the relative velocity v between the magnet and the coil conductor has a constant value. Thus, the value of the induced electromotive force E is determined according to positions of the magnet and the coil wound and degrees of the coil wound existing in the flux, which means that change of the substantial value of the flux density B.

Meanwhile, a force F causing the rotational movement of a motor is generally defined as the following equation (2) according to the law of the Fleming's left-hand.

$$F = Bil \quad (2)$$

Here, i denotes a current flowing through the coil conductor.

As can be seen from the equation (2), the force F is influenced directly by the value of the flux density B. Here, since the value of the flux density B changes its sign according to an N or S-pole of the magnet, the values of the induced electromotive force E and the force F also change accordingly. Thus, a motor can rotate in a predetermined direction only by repeating the operation that the direction of the current flowing through the winding is continuously changed or the current is turned out and then flows again.

Here, a point in time when the flow of the current is changed over can be seen from the curve of the induced electromotive force E. The direction of the current flowing when the induced electromotive force E has a positive value is reversed to that when the latter has a negative value.

The magnets of the rotor alternate between the N-pole and the S-pole. In general, even if the flux overlaps many a coils, the value of the induced electromotive force E does not become large. In FIG. 7, in the case that the magnets 1A1 and 1B5 each having a different polarity are located in the ends of both the windings of the coil 5A1 as from the rotor positions 9 to 11, the value of the induced electromotive force E is reinforced. The reason is why the ends of the windings of two coils 5A1 is the end of the winding of one coil connected actually in the form of a ring.

Figure 8:
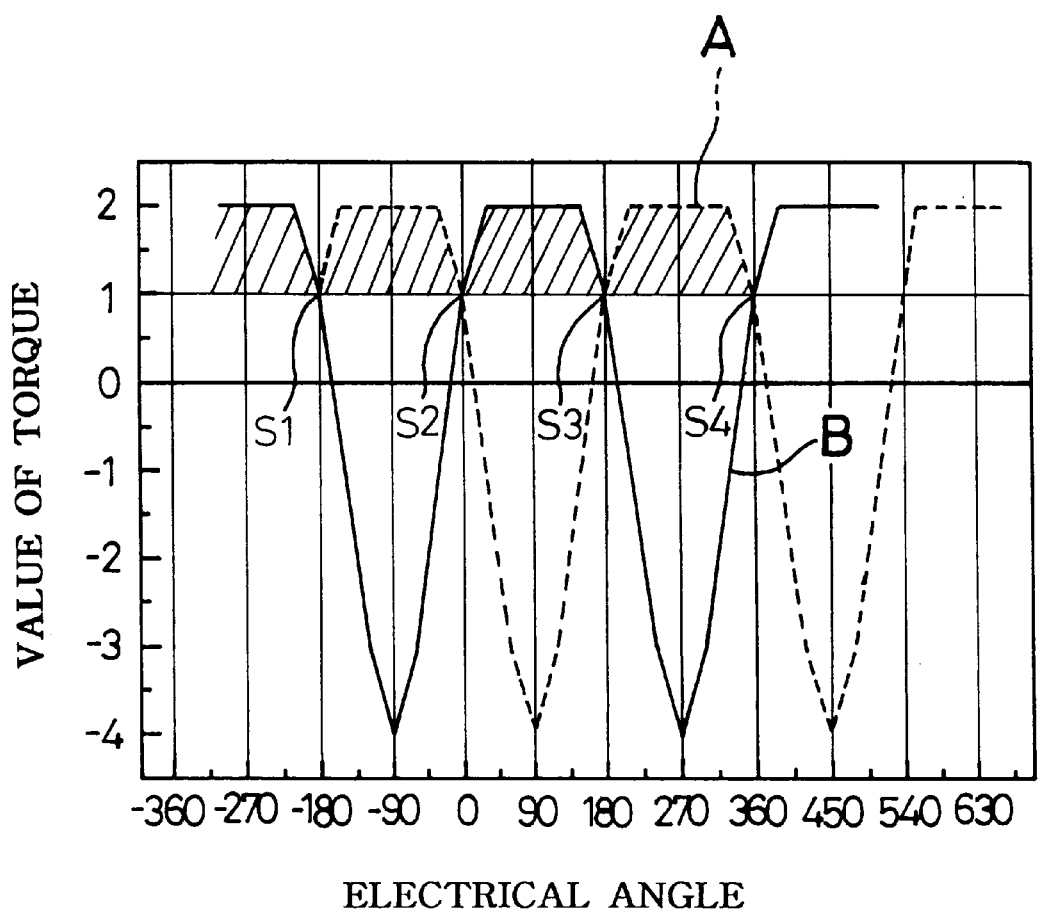
FIG. 8 is a graphical view showing an induced electromotive force according to an electrical angle in the two-phase driven motor according to the present invention.

A curve of the induced electromotive force of the motor according to the present invention which is obtained by taking all the situations into consideration is shown in FIG. 8. It can be seen that since the alignment of the magnets have a non-symmetrical structure, the two-phase curves A and B of the induced electromotive force shown in FIG. 8 according to the present invention are not symmetrical with each other, differently from a general two-phase induced electromotive force curve formed as a sinusoidal wave having positive and negative values symmetrical with each other.

In addition, in the conventional two-phase half-wave driving method, a non-start zone or non-start point (a dead point) exists during activating at 90 degrees or 180 degrees. Thus, a special countermeasure should be taken in order to avoid the non-start zone or the non-start point during starting the motor.

However, the portion having a positive value in the two-phase induced electromotive force curves A and B in this invention occupies 210 degrees among the whole electrical angle 360 degrees and at the same time symmetrically alternates. The current applied to the stator coils L11 (5A1–5A5) and L12 (5B1–5B5) of each phase alternates by a switching driving circuit shown in FIG. 10, at portions S1–S4 where the two-phase induced electromotive force curves A and B overlap, that is, the portions S1–S4 having the magnitude of one in the induced electromotive force E. Accordingly, the motor can rotate in a predetermined one direction.

Figure 10:
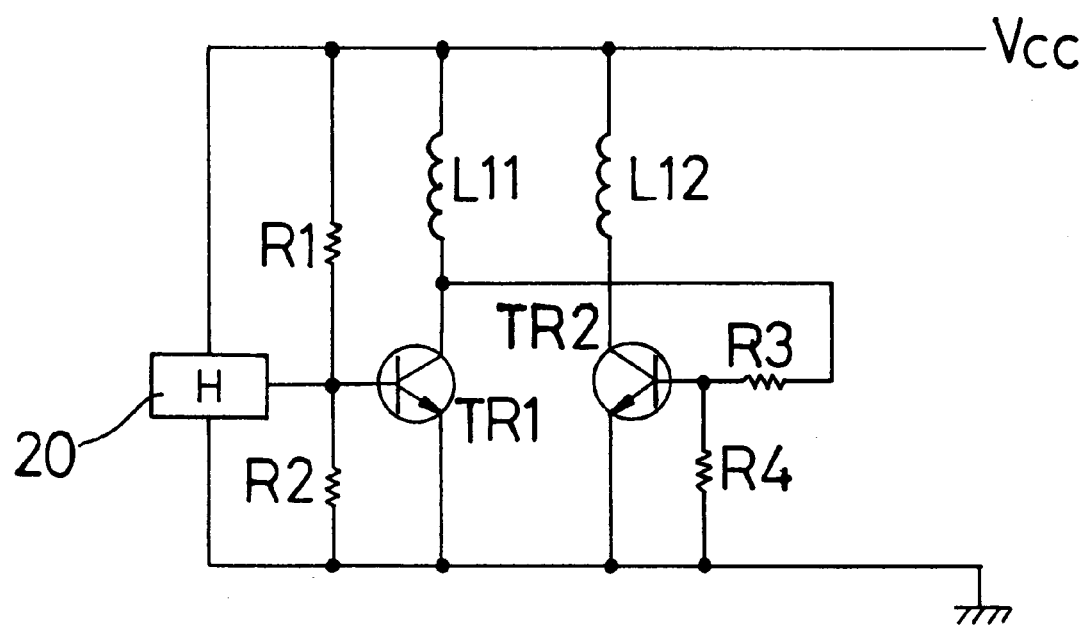
FIG. 10 is a switching driving circuit diagram with respect to the two-phase BLDC motor using a single Hall effect device according to the present invention.

That is, the switching driving circuit of FIG. 10 drives only the portion having a positive value of one or more in the shaded induced electromotive forces A and B so as to be activated. Accordingly, no dead point exists in the two-phase half-wave driving method according to the present invention, and only a few torque ripple exists when compared with the conventional two-phase half-wave driving method.

In a general three-phase full-wave driving method, the end points of the three phases u, v and w are connected with each other. From the point of view in one phase, three procedures are repeated such that current flows in one direction, then flows in the reverse direction, and then sinks. In the case of a single-phase (half-wave driving) driving method as in the present invention, current flows in only one direction.

As a result, since the present invention drives only the portion having a positive value of one or more in the induced electromotive forces so as to be activated, the value of the induced electromotive force becomes very large in comparison with the conventional driving method. This means that since the current flowing through the circuit becomes very small, an efficiency of the motor is high.

It is necessary to detect the accurate switching positions S1–S4 in order to perform an electric switching with respect to the A-phase and B-phase stator coils L11 (5A1–5A5) and L12 (5B1–5B5). For this purpose, as shown in FIG. 9 according to the present invention, auxiliary magnets 15A–15J are uniformly installed inside the main magnets 1a1–1A5 and 1B1–1B5. A single Hall effect device integrated circuit (IC) 20 denoted as "H" is disposes in the same circumferential position of the stator or the control PCB 87 corresponding to the auxiliary magnets, thereby obtaining an accurate switching point in time.

The arc angle θ of each auxiliary magnet is set as an intermediate point of the adjacent magnet pair from the respective intermediate points of the N-pole and S-pole magnet pair which are mutually adjacent in the rotor 10, and the arc angle θ has the 360/2n.

Accordingly, the Hall effect device IC 20 detects the magnetic poles of the auxiliary magnets 15A–15J, thereby generating a constant pulse. In this case, the intervals between the N-pole magnets 15A–15E and the S-pole magnets 15F–15J of the auxiliary magnets 15A–15J are set constant differently from those in the main magnets 1A1–1A5 and 1B1–1B5. As result, the generated pulse is a rectangular pulse signal having a duty of 50%.

In the present invention, the single Hall effect device IC 20 is used, in which case the switching driving circuit shown in FIG. 10 is used to thereby apply current to the stator coil L11 and L12 of each phase alternately. The switching driving circuit of the present invention detects the auxiliary magnets 15A–15J of the rotor 10 by the hall effect device IC 20, a high-level (H) rectangular wave pulse signal is periodically output and applied to a transistor TR1. Accordingly, when the transistor TR1 is turned on, the A-phase stator coil L11 is activated. Thereafter, when a low-level (L) signal is applied from the hall effect device IC 20, the transistor TR1 is turned off and the transistor TR2 is turned on, with a result that current flows in the B-phase stator coil L12. Thus, the rotor 10 rotates with a continuous rotational force. In FIG. 10, resistors R1–R4 set bias voltages with respect to the switching transistors TR1 and TR2.

Figure 4:
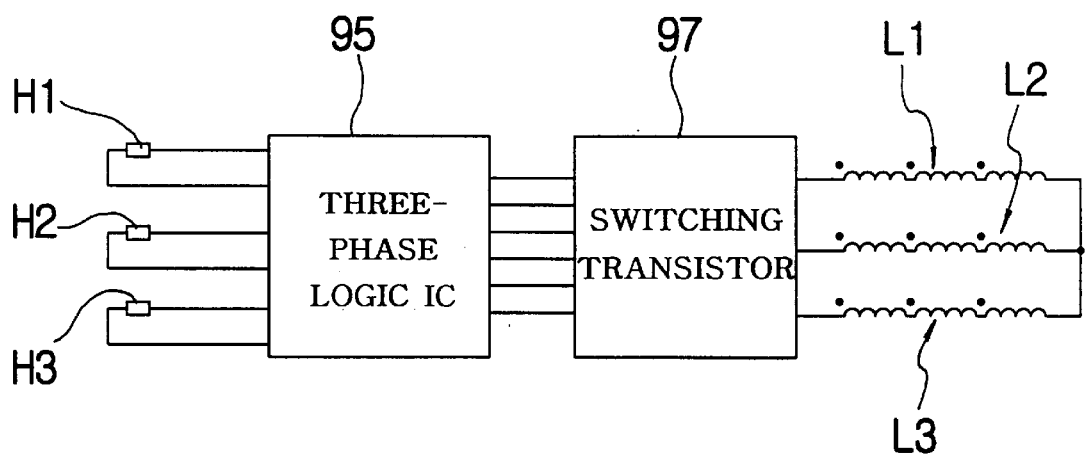
FIG. 4 is a switching driving circuit diagram with respect to the conventional three-phase driven BLDC motor.

Thus, the switching driving circuit according to the present invention does not require a logic IC and thus provides a very simple and economic structure when compared with the conventional switching driving circuit shown in FIG. 4.

In addition, in the case that the present invention is applied to a double rotor structure as shown in FIG. 1, the above auxiliary magnet is not penetratively embedded into the support of the rotor but is attached to the rear surface of the magnetic yoke 83A by means of a rubber magnet. It is also possible to install a Hall effect device IC 20 in the control PCB 87 facing the magnetic yoke 83A.

In the present invention, the rotor is comprised of a plurality of N-pole and S-pole magnet pairs, and the distance between the different magnet pair is two times as much as that between the N-pole and S-pole magnets forming a magnet pair. That is, the magnets are disposed collectively spacing a predetermined distance. That is, two magnets are collectively disposed spacing a predetermined distance, with a result that an induced electromotive force is high. Thus, when adopting a two-phase half-wave driving method, a consumption of current becomes small and a high efficiency can be accomplished.

The magnets of the rotor, the stator coils and the magnets of the auxiliary magnets can be formed of 2n in number in the present invention. Here, a value of n is desirably determined three or more in proportion with to the size of the motor determined according to the performance of a user's desired motor.

As described above, since the number of magnets (poles) in the rotor is equal to that of the coils and the magnets are disposed at different intervals between the magnets, and a switching operation is accomplished at the portion having a positive value of the induction electromotive force using the two-phase half-wave driving method, the present invention can obtain the BLDC motor having a single position detecting device in which a driving circuit is very simple since a rotor can be driven without creating a dead point, and a high efficiency and a small torque ripple are accomplished since magnets are efficiently arranged.

As described above, in the case that the present invention adopts a two-phase half-wave driving method, the principle of the present invention can be applied to any type of motor such as a BLDC motor of a single rotor/a single stator or a double rotor/double stator structure, and a BLDC motor of a double rotor/single stator or a double stator/single rotor structure.

As described above, the present invention has been described as a particularly preferred embodiment. However, the present invention is not limited in the above embodiment and various modifications and changes are possible by one skilled in the art within the scope without departing from the spirit of the present invention.

What is claimed is:

1. A two-phase half-wave driven brushless direct-current (BLDC) motor comprising:

a stator comprised of a first phase coil, a second phase coil, and a first anular support, each of the first phase coil and the second phase coil being formed of n coils, the first phase coil and the second phase coil being connected in a two-phase driving form and disposed at a uniform interval on the annular support;

a shaft whose ends are rotatably supported;

a rotor comprised of n N-pole and n S-pole magnets which are the same number as that of the stator coils and form n pairs of N-pole and S-pole magnets, a magnetic yoke for forming a magnetic circuit together with the n N-pole and n S-pole magnets, and a second annual support on which the n N-pole and n S-pole magnets are alternately disposed, the rotor being supported to the shaft spacing a predetermined air gap from the stator in an axial direction, wherein each pair of N-pole and S-pole magnets are disposed at a uniform interval with respect to each other, and wherein a distant ratio from a first center of one N-pole magnet to a second and third centers of the S-pole magnets adjacent the N-pole magnet is established into 1:1.4;

auxiliary magnets for distinguishing the 2n N-pole and S-pole magnets, the auxiliary magnets comprising n N-pole and n S-pole magnets alternately disposed in the form of an annular ring on the rotor with the same length as each other, in correspondence to the respective N-pole and S-pole magnets of the rotor;

a single Hall effect device for detecting the magnetic poles of the rotor by magnetic flux generated from the rotating auxiliary magnets and generating a rotating position signal of the rotor; and a switching controller for activating the first and second phase coils alternately in response to the rotating position signal.

2. The two-phase half-wave driven BLDC motor according to claim 1, wherein each of the auxiliary magnets is established from a first midpoint between the pair of the N-pole and S-pole magnets of the rotor to a second midpoint between the adjacent magnets, in which an arc angle of each of the auxiliary magnets is 360/2n degrees.

3. The two-phase half-wave driven BLDC motor according to claim 2, wherein the auxiliary magnets are penetratively embedded into the support of the rotor or installed on the rear surface of the magnetic yoke.

4. The two-phase half-wave driven BLDC motor according to claim 2, wherein the auxiliary magnets are installed on the rear surface of the magnetic yoke.

5. The two-phase half-wave driven BLDC motor according to claim 1, wherein the rotating position signal generated from the Hall effect device is a rectangular signal having a duty of 50% and an electrical activation between the first phase coil and the second phase coil is accomplished by 180 degrees.

6. The two-phase half-wave driven BLDC motor according to claim 1, wherein the switching controller comprises a first transistor for electrically activating the first phase coil when the rotating position detecting signal is applied as a high-level signal and a second transistor for electrically activating the second phase coil when the rotating position detecting signal is applied as a low-level signal.

7. The two-phase half-wave driven BLDC motor according to claim 1, wherein a distance between the one magnet pair and adjacent magnet pairs in the rotor is double as much as that between the N-pole and S-pole magnets forming the magnet pair.

* * * * *